United States Patent Office 2,779,762
Patented Jan. 29, 1957

2,779,762

3-SUBSTITUTED-AMINOMETHYL-4-HYDROXY-6-SUBSTITUTED-COUMARINS

Alice Ota Robertson and Dale N. Robertson, Madison, and Karl Paul Link, Middleton, Wis., assignors to Wisconsin Alumni Research Foundation, Madison, Wis., a corporation of Wisconsin No Drawing. Application October 9, 1953,
Serial No. 385,299

6 Claims. (Cl. 260—247.7)

The present invention relates to chemical compounds and the processes of making the same. More specifically the invention relates to certain 3-substituted-aminomethyl-4-hydroxy-6-substituted-coumarins. The compounds can be represented by the following general formula:

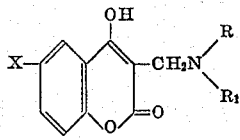

where X is selected from the group consisting of halogen, lower alkyl and lower alkoxy groups, R is selected from the group consisting of hydrogen and methyl, R' is a lower alkyl group and R and R' together with the N form a heterocyclic group.

GENERAL PROCESS

To a solution of formaldehyde and the appropriate amine in absolute ethanol at room temperature is first added the appropriate 4-hydroxy-6-substituted-coumarin. The reactants are ordinarily reacted in equimolar quantities although the amine can be employed in excess e. g. 0.25 mole excess. The 4-hydroxy-6-substituted-coumarin can be added to the formaldehyde-amine solution in the dry solid state or in ethanol solution. The reactants are thoroughly mixed and allowed to stand at room temperature until an extensive precipitation has occurred. This may be within a few minutes or overnight or longer. Precipitation may be hastened by cooling or by the addition of absolute ethyl ether or other non-polar solvent. In some cases the warming of the reaction mixture is preferred as a means for speeding up the reaction, although refluxing, for example, should be avoided where the reactants or particular reaction product tends to undergo decomposition at refluxing temperatures. The compounds can be conveniently recovered from the reaction mixtures by filtration. As they are obtained analytically pure, recrystallization is not necessary. Some compounds, however, were found to contain water of crystallization which is not removed by drying in vacuo for 24 hours at room temperature.

The following specific examples will serve to illustrate the invention.

EXAMPLE I

*3-ethyl-aminomethyl-4-hydroxy-6-chlorocoumarin*

To a solution of 0.25 mole of formaldehyde and 0.3 mole of ethylamine in 750 ml. of absolute ethanol is first added 0.25 mole of 4-hydroxy-6-chlorocoumarin. The resulting reaction mixture is next mixed at room temperature and then allowed to stand at about 5° C. in a refrigerator overnight. The desired product which separates as a precipitate is recovered by filtration. It has a melting point of 224–231° C. (d) i. e. with decomposition.

EXAMPLE II

*3-n-butyl-aminomethyl-4-hyroxy-6-chlorocoumarin*

This product is prepared in accordance with the above described process by employing as the amine, normal butylamine. The desired product has a melting point of 198–222° C. (d).

EXAMPLE III

*3-s-butyl-aminomethyl-4-hydroxy-6-chlorocoumarin*

This product is prepared as described above employing as the amine, secondary butylamine. It has a melting point of 232–238° C. (d).

EXAMPLE IV

*3-(α,α-dimethylethanol)-aminomethyl-4-hydroxy-6-chlorocoumarin*

This product is prepared as described above employing as the amine, 2-amino-2-methyl-propanol-1. It has a melting point of 205–218° C. (d).

EXAMPLE V

*3-dimethyl-aminomethyl-4-hydroxy-6-bromocoumarin*

This product is prepared as described above by reacting formaldehyde, dimethylamine and 4-hydroxy-6-bromocoumarin in equimolar quantities. It has a melting point of 186–188° C. (d).

EXAMPLE VI

*3-i-butyl-aminomethyl-4-hydroxy-6-bromocoumarin*

This product is prepared as described above in Example V, employing as the amine, iso-butylamine. It has a melting point of 205–225° C. (d).

EXAMPLE VII

*3-methyl-aminomethyl-4-hydroxy-6-methylcoumarin*

This product is prepared as described above by reacting formaldehyde, methylamine and 4-hydroxy-6-methylcoumarin in equimolar quantities. It has a melting point of 223–231° C. (d).

EXAMPLE VIII

*3-benzyl-aminomethyl-4-hydroxy-6-methylcoumarin*

This product is prepared as described above in Example VII, employing as the amine, benzylamine. It has a melting point of 125–126° C. (d).

EXAMPLE IX

*3-piperidinomethyl-4-hydroxy-6-methylcoumarin*

This product is prepared as described above employing piperidine as the amine. It has a melting point of 184–185° C. (d). A similar type N-heterocycloalkyl product can be prepared by using tetrahydropyrrole as the amine.

EXAMPLE X

*3-carbethoxy-methyl-aminomethyl-4-hydroxy-6-methylcoumarin*

This product is prepared as described above employing ethyl glycinate as the amine. It has a melting point of 263–264° C. (d).

EXAMPLE XI

*3-carbethoxy-ethyl-aminomethyl-4-hydroxy-6-methylcoumarin*

This product is prepared as described above employing ethyl α-alaninate as the amine. It has a melting point of 282° C. (d). In this example and Example X, other lower alkyl (methyl, propyl, etc.) esters of the amino acids can be employed to prepare the desired carbalkoxy derivatives.

EXAMPLE XII

*3-n-propyl-aminomethyl-4-hydroxy-6-methoxycoumarin*

This product is prepared as described above by reacting formaldehyde, normal propylamine and 4-hydroxy-6-methoxycoumarin. It has a melting point of 163–164° C. (d). (The entire sample on melting became a mass of bubbles, but a clear liquid did not result.)

EXAMPLE XIII

*3-n-hexyl-aminomethyl-4-hydroxy-6-methoxycoumarin*

This product is prepared as described above in Example XII, employing as the amine, normal hexylamine. It has a melting point of 132–136° C.

EXAMPLE XIV

*3-phenylethyl-aminomethyl-4-hydroxy-6-methoxycoumarin*

This product is prepared as described above employing as the amine, phenylethylamine. It has a melting point of 146–147° C.

EXAMPLE XV

*3-(2-hydroxy-propyl)-aminomethyl-4-hydroxy-6-methoxycoumarin*

This product is prepared as described above employing as the amine, 1-amino-propanol-2. It has a melting point of 246° C. (d).

EXAMPLE XVI

*3-i-propyl-aminomethyl-4-hydroxy-6-ethoxycoumarin*

This product is prepared as described above by reacting formaldehyde, iso-propylamine and 4-hydroxy-6-ethoxycoumarin. It has a melting point of 140–143° C. (d).

EXAMPLE XVII

*3-cyclohexyl-aminomethyl-4-hydroxy-6-ethoxycoumarin*

This product is prepared as described above in Example XVI by employing as the amine, cyclohexylamine. It has a melting point of 145–150° C. (d).

EXAMPLE XVIII

*3-allyl-aminomethyl-4-hydroxy-6-ethoxycoumarin*

This product is prepared as described above employing as the amine, allylamine. It has a melting point of 228–234° C. (d).

Additional compounds prepared as described above are set forth in the following tables.

TABLE I

*3-substituted-aminomethyl-4-hydroxy-6-chlorocoumarins*

| 3-Substituent | Melting Point, °C. | Amine Disclosed in Example |
|---|---|---|
| —$CH_2N(CH_3)_2$ | 197 (d) | V |
| —$CH_2NHC_3H_7$-n | 215–220 (d) | XII |
| —$CH_2NHC_3H_7$-i | 230–240 (d) | XVI |
| —$CH_2NHC_6H_{13}$-n | 159–160 | XIII |
| —$CH_2NH$ cyclohexyl | 202 (d) | XVII |
| —$CH_2NH(CH_2)_2C_6H_5$ | 185–225 (d) | XIV |
| —Piperidinomethyl | 184–185 (d) | IX |
| —$CH_2NHCH_2CH$=$CH_2$ | 298–300 (d) | XVIII |
| —$CH_2NHCH_2CHCH_3$<br>                     $\|$<br>                     OH | 190–209 (d) | XV |

TABLE II

*3-substituted-aminomethyl-4-hydroxy-6-bromocoumarins*

| 3-Substituent | Melting Point, °C.[3] | Amine Disclosed in Example |
|---|---|---|
| —$CH_2NHC_2H_5$ | 217–225 | I |
| —$CH_2NHC_3H_7$-n | 220–230 | XII |
| —$CH_2NHC_3H_7$-i | 237–242 | XVI |
| —$CH_2NHC_4H_9$-n | 218–229 | II |
| —$CH_2NHC_4H_9$-s | 240–248 | III |
| —$CH_2NHC_6H_{13}$-n | [1] 163.5–165 | XIII |
| —$CH_2NH$ cyclohexyl | 199–213 | XVII |
| —$CH_2NH(CH_2)_2C_6H_5$ | 192–227 | XIV |
| —$CH_2NHCH_2CH$=$CH_2$ | 197–244 | XVIII |
| —$CH_2NHCH_2CHCH_3$<br>                     $\|$<br>                     OH | [2] 202 | XV |
|                   $CH_3$<br>                   $\|$<br>—$CH_2NHC$—$CH_2OH$<br>                   $\|$<br>                  $CH_3$ | 224–230 | IV |

[1] Resolidifies and is finally molten again by 194° C.
[2] Resolidifies and is finally molten again by 212° C.
[3] All compounds melt with decomposition.

TABLE III

*3-substituted-aminomethyl-4-hydroxy-6-methylcoumarins*

| 3-Substituent | Melting Point, °C. | Amine Disclosed in Example |
|---|---|---|
| —$CH_2N(CH_3)_2$ | 189 (d) | V |
| —$CH_2NHC_2H_5$ | [1] 171 (d) | I |
| $CH_2NHC_3H_7$-n | 148–150 (d) | XII |
| —$CH_2NHC_3H_7$-i | 166 (d) | XVI |
| —$CH_2NHC_4H_9$-n | 128–132 (d) | II |
| —$CH_2NHC_4H_9$-i | 165 (d) | VI |
| —$CH_2NHC_4H_9$-s | 142 (d) | III |
| —$CH_2NHC_6H_{13}$-n | 138 | XIII |
| —$CH_2NH$ cyclohexyl | 186–187 (d) | XVII |
| —$CH_2NH(CH_2)_2C_6H_5$ | [2] 135–140 | XIV |
| —$CH_2NHCH_2CH$=$CH_2$ | 294–295 (d) | XVIII |
| —$CH_2NHCH_2CHCH_3$<br>                     $\|$<br>                     OH | 197.5–201 (d) | XV |
|                   $CH_3$<br>                   $\|$<br>—$CH_2NHC$—$CH_2OH$<br>                   $\|$<br>                  $CH_3$ | 181–184 | IV |

[1] When heated slowly sinters at 171° C. and gradually melts up to 218° C. If introduced in the bath at 171° C. the compound decomposes vigorously, resolidifies and melts again, with decomposition, at 215–218° C.
[2] Resolidifies and melts again at 183–185° C.

TABLE IV

*3-substituted-aminomethyl-4-hydroxy-6-methoxycoumarins*

| 3-Substituent | Melting Point, °C. | Amine Disclosed in Example |
|---|---|---|
| —$CH_2NHCH_3$ | 247–250 (d) | VII |
| —$CH_2N(CH_3)_2$ | 198 (d) | V |
| —$CH_2NHC_2H_5$ | [1] 168–188 (d) | I |
| —$CH_2NHC_3H_7$-i | 164 (d) | XVI |
| —$CH_2NHC_4H_9$-n | 163–164 (d) | II |
| —$CH_2NHC_4H_9$-i | [2] 183–250 (d) | VI |
| —$CH_2NH$ cyclohexyl | 165–166 (d) | XVII |
| —$CH_2NHCH_2C_6H_5$ | [3] 126–128 (d) | VIII |
| —$CH_2NHCH_2CH$=$CH_2$ | 249–252 (d) | XVIII |
| -Piperidinomethyl | 178 (d) | IX |

[1] Decomposes gradually over entire range. Decomposes vigorously if introduced in bath at 188° C.
[2] Decomposed over entire range after sintering at 165° C.
[3] Entire sample became a mass of bubbles with no resulting clear liquid.

TABLE V
3-substituted-aminomethyl-4-hydroxy-6-ethoxycoumarins

| 3-Substituent | Melting Point, °C. | Amine Disclosed in Example |
|---|---|---|
| —CH$_2$N(CH$_3$)$_2$ | 200 (d) | V |
| —CH$_2$NHC$_2$H$_5$ | 158–160 (d) | I |
| —CH$_2$NHC$_3$H$_7$-n | 156–160 (d) | XII |
| —CH$_2$NHC$_4$H$_9$-n | 160 (d) | II |
| —CH$_2$NHC$_4$H$_9$-s | 140–142 (d) | III |
| —CH$_2$NHCH$_2$C$_6$H$_5$ | 133–135 | VIII |
| —CH$_2$NH(CH$_2$)$_2$C$_6$H$_5$ | [1] 144–145 (d) | XIV |
| —CH$_2$NHCH$_2$CHCH$_2$<br>                                           \|<br>                                          OH | 178 (d) | XV |
| -Piperidinomethyl | 162 (d) | IX |

[1] Decomposed after sintering at 115° C.

In the tables and description (d) denotes decomposition. The compounds melting over a wide range usually darken and sinter several degrees below the melting range.

In the above examples it will be understood that X represents any of the halogens such as iodine and fluorine as well as the chlorine and bromine derivatives, and that X represents various other lower alkyl and lower alkoxy groups such as ethyl, propyl, butyl, amyl, hexyl, propoxy, butoxy, etc. It will also be understood that R' represents substituted lower alkyl groups such as disclosed in Examples IV, VIII, X, XI, XIV, and XV, as well as cycloalkyl and unsaturated alkyl groups such as disclosed in Examples XVII and XVIII. The compounds of the invention are of interest in various fields including the 4-hydroxycoumarin anticoagulant field.

The various names to be applied to the compounds listed in the above tables will be obvious. In Table I, for example, the first compound is 3-dimethyl-aminomethyl-4-hydroxy-6-chlorocoumarin and the seventh compound is 3-piperidinomethyl-4-hydroxy-6-chlorocoumarin. Similarly, the seventh compound in Table IV is 3-cyclohexyl-aminomethyl-4-hydroxy-6-methoxycoumarin. Mixed amines, e. g. methyl, ethyl-amine, can also be employed to prepare various compounds where R is methyl and R' is a lower alkyl group. Other compounds falling within the scope of the invention are listed in the following table.

TABLE VI
3-morpholino-methyl-4-hydroxy-6-substituted-coumarins

| 6-Substituent | Melting Point ° C. |
|---|---|
| Chloro | 171–172 (d) |
| Bromo | 177.5–178.5 (d) |
| Methyl | 143–144.5 (d) |
| Methoxy | 120–122.5 (d) |
| Ethoxy | 175–176 (d) |

The fifth or last compound in this table is 3-morpholino-methyl-4-hydroxy-6-ethoxycoumarin and is prepared by reacting formaldehyde, morpholine and 4-hydroxy-6-ethoxycoumarin in equimolar quantities in accordance with the above examples. The other 3-morpholino compounds are prepared in a like manner employing morpholine as the amine and by use of the appropriate 6-substituted-coumarin. The compounds of the present invention have anticoagulant activity.

We claim:
1. The products, 3-R, R'-aminomethyl-4-hydroxy-6-X-coumarin, where R is selected from the group consisting of hydrogen and methyl, R' is selected from the class consisting of lower alkyl and cycloalkyl groups, R and R' together with the N form a heterocyclic group selected from the group consisting of piperidino and morpholino groups, and X is selected from the class consisting of chlorine, bromine, lower alkyl and lower alkoxy groups.

2. The product 3-dimethyl-aminomethyl-4-hydroxy-6-chlorocoumarin.

3. The product 3-cyclohexyl-aminomethyl-4-hydroxy-6-methoxycoumarin.

4. The product 3-piperidinomethyl-4-hydroxy-6-chlorocoumarin.

5. The product 3-isobutyl-aminomethyl-4-hydroxy-6-bromocoumarin.

6. The product 3-morpholino-methyl-4-hydroxy-6-ethoxycoumarin.

No references cited.